(12) United States Patent
Trubnikov et al.

(10) Patent No.: US 6,896,491 B2
(45) Date of Patent: May 24, 2005

(54) BEARING MOUNTING FLANGE HAVING FLEXIBILITY POCKET

(75) Inventors: Timur T. Trubnikov, Peoria, IL (US); Bryan E. Nelson, Lacon, IL (US)

(73) Assignee: Caterpillar Inc, Peoria, IL (US)

( * ) Notice: Subject to any disclaimer, the term of this patent is extended or adjusted under 35 U.S.C. 154(b) by 260 days.

(21) Appl. No.: 10/314,492

(22) Filed: Dec. 9, 2002

(65) Prior Publication Data

US 2004/0109626 A1 Jun. 10, 2004

(51) Int. Cl.[7] .............................................. F04B 53/00
(52) U.S. Cl. ...................... 417/313; 417/572; 417/269; 417/423.12; 417/423.14; 384/585; 384/542; 384/537
(58) Field of Search ................................. 417/269, 313, 417/572, 423.12, 423.14; 384/585, 542, 537

(56) References Cited

U.S. PATENT DOCUMENTS

| | | |
|---|---|---|
| 2,345,952 A | 4/1944 | Smith |
| 3,692,372 A | 9/1972 | Pineo |
| 4,090,746 A | 5/1978 | Harkins et al. |
| 4,248,486 A | 2/1981 | Bradley, Jr. |
| 4,302,062 A | 11/1981 | Hunter, Jr. et al. |
| 4,343,203 A | 8/1982 | Jacobson et al. |
| 4,460,284 A | 7/1984 | Lauterbach et al. |
| 4,594,055 A * | 6/1986 | Hatakeyama et al. ....... 417/269 |
| H242 H * | 4/1987 | Eng ............................. 29/525 |
| 5,230,610 A * | 7/1993 | Reichenmiller ............. 417/269 |
| 5,829,892 A * | 11/1998 | Groves ........................ 384/537 |
| 6,045,268 A * | 4/2000 | Long et al. ................. 384/542 |
| 6,145,199 A | 11/2000 | Malchow et al. |

* cited by examiner

Primary Examiner—Justine R. Yu
Assistant Examiner—Emmanuel Sayoc
(74) Attorney, Agent, or Firm—Finnegan, Henderson, Farabow, Garrett & Dunner

(57) ABSTRACT

A mounting flange for housing a bearing cup of a roller bearing is disclosed. The mounting flange includes a recess sized to receive the bearing cup. A radial wall is defined by the recess and an outer periphery of the mounting flange. The radial wall includes at least one region of greater radial thickness than the radial thickness at another region. The at least one region of radial thickness defines at least one ear. The mounting flange also includes at least one flexibility pocket in the at least one ear. The flexibility pocket is configured to provide substantially uniform, radial deformation to the mounting flange when the bearing cup is fit into the recess.

22 Claims, 3 Drawing Sheets

BEARING MOUNTING FLANGE HAVING FLEXIBILITY POCKET

TECHNICAL FIELD

This application relates generally to a mounting flange for housing a bearing cup. More particularly, the application relates to a mounting flange having flexibility pockets.

BACKGROUND

A bearing is a connector allowing connected members to rotate relative to each other. Often one of the members is fixed, and the bearing acts as a support for the rotating member. Bearings include rolling elements that may take many forms, but are principally classified as balls or rollers. The rollers may likewise take a variety of forms, which are principally uniform cylinders, barrels, or cones, depending upon the application.

A unique feature of rolling element bearings is that their useful life typically is not determined by wear, but rather by fatigue of the operating surfaces due to repeated stresses associated with use. It is generally accepted that fatigue failure of rolling element bearings occurs as a result of progressive flaking or pitting of the surfaces of the rolling elements and the surfaces of corresponding bearing races. This flaking and/or pitting causes the rolling elements to seize, thereby generating intense heat, pressure, and friction.

Typically, a bearing cup is installed in a bearing housing or mounting flange with an interference fit based on the design requirements.

However, the mounting flange is typically not designed to uniformly, elastically deform during installation of the bearing cup. For instance, when a bearing cup is press fit into the flange, regions having a high radial stiffness deform less than regions having a low radial stiffness. Accordingly, non-uniform strain is applied to the bearing cup when the cup is press fit into a mounting flange having an inconsistent shape. As such, the bearing cup is deformed to have localized radial protrusions. The protrusions are high points in the cup that the bearing rolling elements must roll over, which causes fatigue failure of the cup and rollers, resulting in damage to the bearings.

One attempt to address the deficiencies caused by non-uniform strain is disclosed in U.S. Pat. No. 3,692,372 to Pineo. Pineo discloses an outside bearing race fixed to an engine frame using an annular bearing support plate. The support plate includes an axially thickened boss portion, through which a lubricant aperture extends. Three cuts isolate three sides of the axially thickened boss from the remainder of the bearing support plate, thereby allowing uniform radial thermal expansion of the outer bearing race.

However, Pineo fails to address expansion of a flange having an uneven radial thickness, such as occurs when a mounting flange has ears for attachment to other components. Furthermore, Pineo does not address the non-uniform expansion that occurs during press fitting of a bearing cup into the mounting flange. Finally, Pineo fails to address the problems that occur when applied loads are not only axial, but also are radial.

The present application is directed at overcoming one or more of the deficiencies in the art.

SUMMARY OF THE INVENTION

A mounting flange for housing a bearing cup of a roller bearing is disclosed. The mounting flange includes a recess sized to receive the bearing cup. A radial wall is defined by the recess and an outer periphery of the mounting flange. The radial wall includes at least one region of greater radial thickness than the radial thickness at another region. The at least one region of radial thickness defines at least one ear. The mounting flange also includes at least one flexibility pocket in the at least one ear. The flexibility pocket is configured to provide substantially uniform, radial deformation to the mounting flange when the bearing cup is fit into the recess.

A method for making a mounting flange having substantially uniform, elastic deformation is also disclosed. The mounting flange includes an outer periphery and a recess for receiving a bearing cup. The method includes estimating local radial stiffness of a radial wall defined by the recess and the outer periphery of the mounting flange. The radial wall may include at least one region of greater radial thickness than the radial thickness at another region, thereby influencing the radial stiffness. The method also includes forming at least one flexibility pocket in the radial wall of the mounting flange having high radial stiffness.

It is to be understood that both the foregoing general description and the following detailed description are exemplary and explanatory only.

BRIEF DESCRIPTION OF THE DRAWINGS

The foregoing and other features of the mounting flange will be apparent from the following, more particular description of the mounting flange, as illustrated in the accompanying drawings.

DETAILED DESCRIPTION

Embodiments of the mounting flange are now described with reference to the figures wherein like reference numbers indicate like elements. Also in the figures, the left most digit of each reference number corresponds to the figure in which the reference number is first used.

Figure 1:
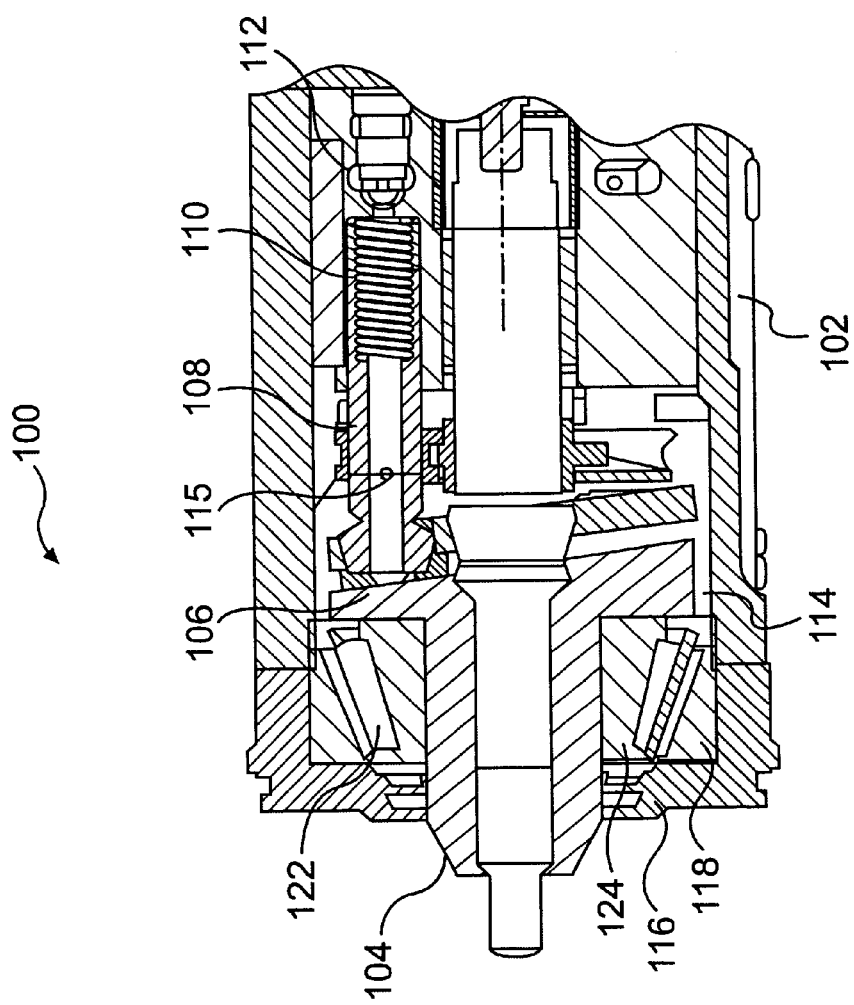
FIG. 1 is a diagrammatic cross-sectional illustration of a hydraulically actuated fixed displacement pump including an exemplary embodiment of a mounting flange.

Referring to FIG. 1, a fixed-displacement, variable-delivery hydraulic pump 100 is shown. However, pump 100 could be another type of pump known to those skilled in the art. Pump 100 could be a pump used in a hydraulically-actuated, electronically-controlled unit injector (HEUI) fuel system. Pump 100 includes a housing 102 containing various components. Within pump housing 102 is an assembly including a rotating shaft 104 that is coupled directly to the output of an engine via a gear drive mechanism or other means, such that the rotation rate of shaft 104 is directly proportional to the drive shaft of the engine. A fixed angle swash plate 106 is attached to shaft 104. The rotation of swash plate 106 causes a plurality of parallel disposed pistons 108 to reciprocate from left to right. In this example, pump 100 includes pistons 108 that are continuously urged toward swash plate 106 by individual return springs 110. One end of each piston 108 is maintained in contact with swash plate 106 in a conventional manner. Because swash plate 106 has a fixed angle, pistons 108 reciprocate through a fixed reciprocation distance with each rotation of shaft 104. Thus, pump 100 can be thought of as a fixed-displacement pump. However, a control valve determines whether the displaced fluid is pushed into a high pressure area past a check valve 112 or spilled back into a low pressure area 114 via a spill port 115.

A mounting flange 116 containing a bearing cup 118 is attached to housing 102 by tie bolts (not shown) extending through housing 102 from mounting flange 116. Other mounting schemes may be used, including, for example, a flange, threaded retainers such as nuts, etc. Bearing cup 118 is the outer race of a tapered roller bearing having rollers 122 and an inner race 124. Inner race 124 is fixed to shaft 104. Other types of bearings may be used, including, for example, cylindrical, ball, and roller bearings.

Figure 2:
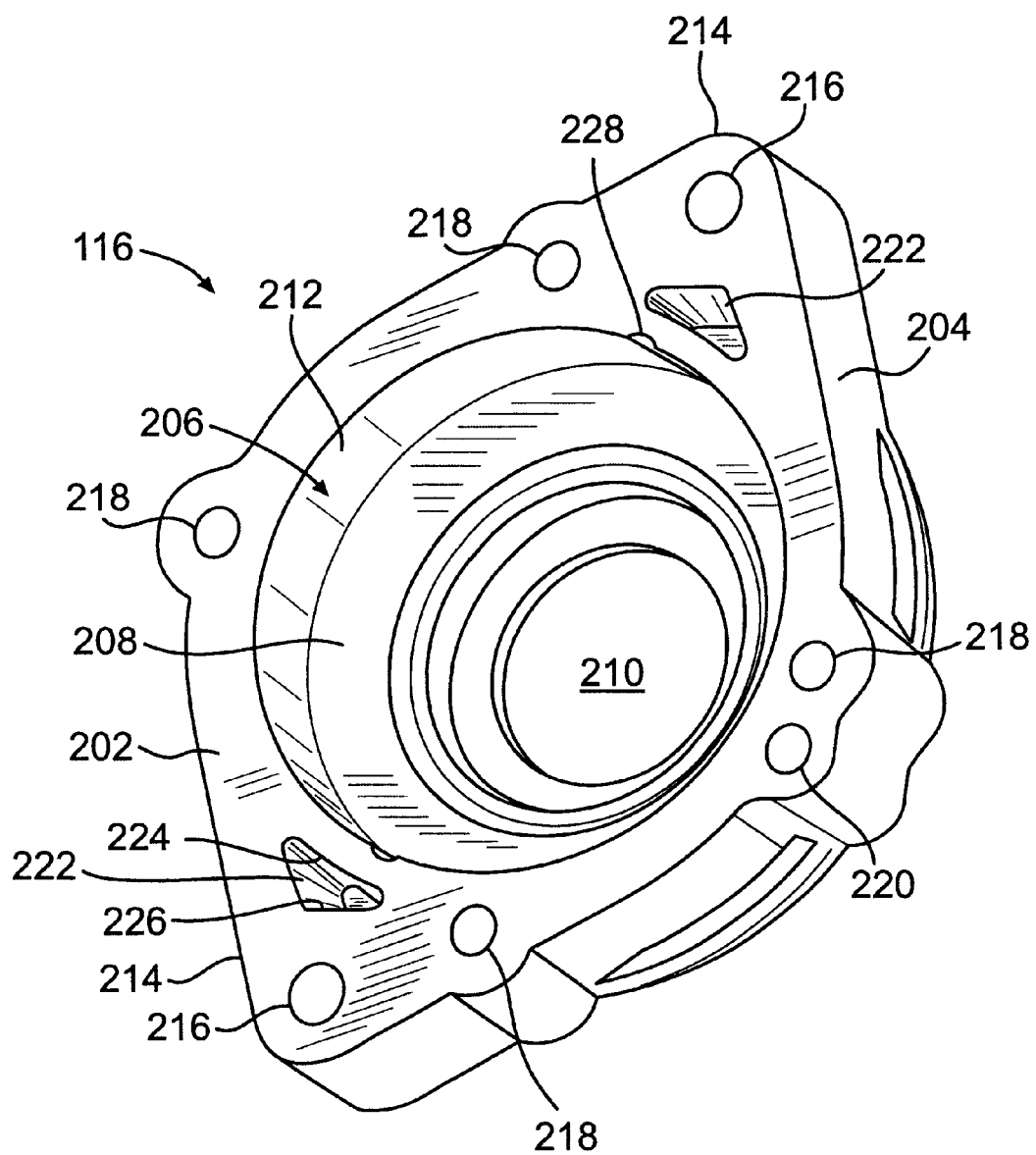
FIG. 2 shows a perspective view of the exemplary embodiment of the mounting flange of FIG. 1.

FIG. 2 shows the mounting flange 116 of FIG. 1 separated from pump housing 102. Mounting flange 116 includes a planar face 202 for mating with pump housing 102. A gasket or O-ring may be disposed between planar face 202 and pump housing 102 to eliminate fluid leakage from mounting flange 116 and to restrict contaminants from entering into mounting flange 116.

An outer periphery 204 extends around mounting flange 116, forming the exterior wall of the mounting flange. Mounting flange 116 includes a recess 206 for receiving a bearing cup, such as an outer race of a roller bearing. Because recess 206 is configured to receive a roller bearing, recess 206 may be a round configuration. Recess 206 includes a base surface 208 forming a bottom of recess 206. Base surface 208 typically includes a bore 210 extending therethrough, formed substantially concentric with recess 206. Bore 210 allows a shaft, such as shaft 104 of FIG. 1, to extend through mounting flange 116. However, as would be apparent to one skilled in the art, mounting flange 116 need not have base surface 208, but recess 206 could be a through hole allowing a bearing and shaft to be fitted in place. In such a configuration, a bearing could be held in place through a friction fit, a key, a lip in recess 206, or other means, as would be apparent to one skilled in the art. In addition, a combination of two or more bearing recesses with an adjustable housing/flange configuration may be considered for other applications.

Recess 206 includes an inner wall 212 extending circumferentially around and defining recess 206. The distance between inner wall 212 and outer periphery 204 defines a wall thickness measured as a radial thickness. As can be seen in FIG. 2, the wall thickness can vary depending on the location of measurement.

Mounting flange 116 includes ears 214, which have a wall thickness greater than the wall thickness at other regions. Variation in radial wall thickness may result in non-uniform radial deformation of inner wall 212 when radial forces are applied to inner wall 212, such as when a bearing cup is press fit into recess 206, as described below.

Ears 214 each include mounting holes 216 extending through mounting flange 116. Mounting holes 216 may be smooth bored or threaded holes configured to receive an attachment bolt for bolting mounting flange 116 to, for example, an engine. However, ears 214 need not have mounting holes. Ears 214 constitute regions having increased resistance to radial deformation when a load is applied radially to inner wall 212 of recess 206.

Mounting flange 116 may include four tapped bolt holes 218 forming a square or rectangle around recess 206. Bolt holes 218 are configured to receive tie bolts that extend through the pump housing to attach mounting flange 116 to pump housing 102. An operator may pull planar face 202 of mounting flange 116 against the mating face of pump housing 102 by tightening the tie bolts, securely sealing planar face 204 into a gasket or seal. Accordingly, the opportunity for leakage may be reduced. A fluid passage hole 220 may be configured to align with a fluid passage in pump housing 102 to enable fluid to properly flow through mounting flange 116, as needed. However, as would be apparent to one skilled in the art, bolt holes 218 and fluid passage hole 220 need not be included in mounting flange 116, depending on the application. Furthermore, additional holes or passages may be included in mounting flange as necessary.

Strain or radial deformation may occur when a radial load is placed on inner wall 212. The radial load could be the strain applied, for example, as a result of thermal expansion when the bearing cup and the flange are formed of different materials, or when a bearing cup is press fit into recess 206. A press fit, as referred to herein, is intended to include any interference fit. The level of the strain or deformation is determined by the tightness of the fit. For instance, a tight interference fit would significantly increase the strain, while a loose interference fit would only slightly increase the strain. The fit is determined based on a consideration of the application, and can be easily derived using known methods, as would be recognized by one skilled in the art.

Because the wall thickness of mounting flange 116 varies, the strain also varies. Typically, regions having an increased radial wall thickness, such as ears 214, have a lower strain than regions having a lesser wall thickness. When a bearing cup is press fit into a mounting flange, the bearing cup strains the mounting flange. Likewise, just as the bearing cup applies a radial load on inner wall 212, inner wall 212 applies an inward radial load on the bearing cup. Typically, the regions of mounting flange 116 having a lower strain apply a larger strain to the bearing cup as is apparent to one skilled in the art. Accordingly, the region of the bearing cup that is adjacent to ears 214 is more strained than the regions of bearing cup adjacent to areas of mounting flange 116 having a lesser wall thickness.

In order to provide a uniform strain on the mounting flange and the bearing cup, flexibility pockets 222 may be formed into mounting flange 116 in the regions most resistant to strain. Although two flexibility pockets are shown formed into mounting flange 116, one skilled in the art will recognize that a lesser or larger number of flexibility pockets may be so utilized, depending on the design.

Flexibility pockets 222 have an inner pocket wall 224 and an outer pocket wall 226. Inner pocket wall 224 may be concentric with the periphery of recess 206. Outer wall may be any appropriate shape that provides strain relief. Flexibility pocket 222 allows inner wall 212 to expand uniformly when a bearing cup is press fit into recess 206. Accordingly, the bearing cup is subjected to uniform strain and may maintain its concentricity. As such, the roller life and the bearing cup life may be significantly extended.

Inner pocket wall 224 and outer pocket wall 226 may be parallel to inner wall 212 and may have the same depth as recess 206. Accordingly, when recess 206 is a through hole, flexibility pockets 222 may also be through holes. However, flexibility pockets 222 need not have the same depth of recess 206, but may be less deep or more deep as would be apparent to one skilled in the art. Furthermore, inner pocket wall 224 and/or outer pocket wall 226 may be tapered or sloped, so long as flexibility pocket 222 provides uniform radial deformation under a load.

Flexibility pockets 222 may not be centered in ears 214. This is because of the proximity of flexibility pockets 222 to bolt holes 218. Although the bolt holes may be designed to be far enough away from recess 206 so as to have a negligible effect on strain, when combined with a flexibility pocket, the strain relief could be excessive, allowing an overabundance of deformation in the direction of the ears. Accordingly, flexibility pockets 222 may be formed off-center to provide uniform strain relief.

Mounting flange 116 may also include relief grooves 228 formed into inner wall 212. Relief grooves 228 may provide hoop stress relief to mounting flange 116 as a bearing cup is pressed into the recess of the mounting flange. Relief grooves 228 may be formed parallel to the axis of the circular recess and extend the length of inner wall 212. Relief grooves 228 may be either cast or machined and may serve as fluid paths.

Figure 3:
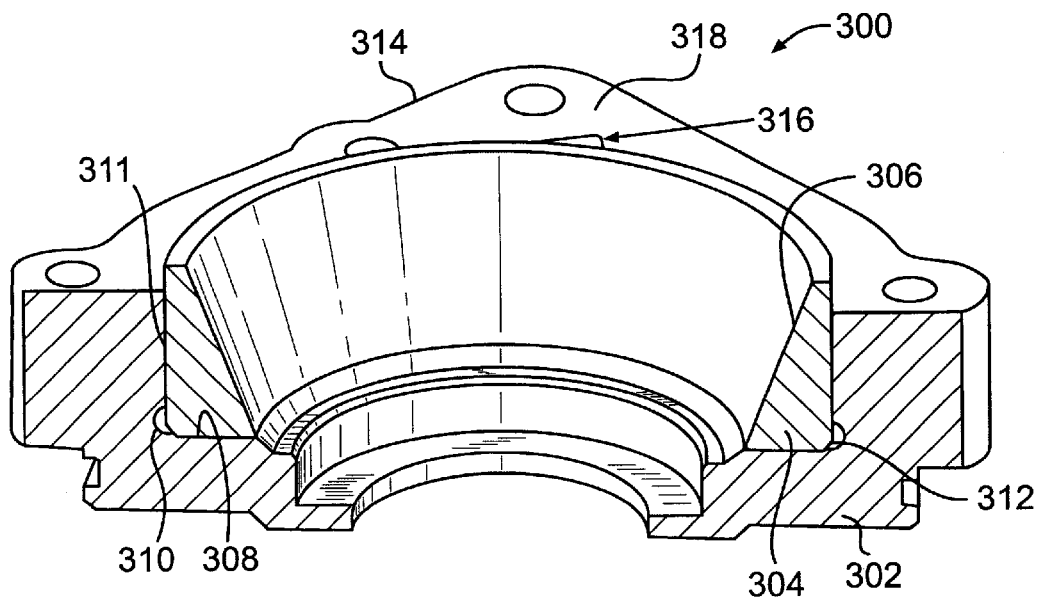
FIG. 3 is a cross-sectional view of another exemplary embodiment of a mounting flange.

FIG. 3 shows a cross-sectional view of a cup and flange assembly 300. Cup and flange assembly 300 include mounting flange 302 and bearing cup 304. Mounting flange 302 may be the flange described with reference to FIG. 2. In this embodiment, bearing cup 304 has a tapered inner wall 306. Tapered inner wall 306 is the inner bearing race against which roller bearings roll. A tapered inner wall may be used to carry axial shaft loads. Although inner wall 306 is shown as tapered, it could also be cylindrical, having the same inner diameter at both ends of inner wall 306.

In the embodiment of FIG. 3, bearing cup 304 is fit directly against a base surface 308 of mounting flange 302. When used in a fixed displacement pump as shown in FIG. 1, both radial loads and axial loads are applied to the mounting flange 302. Base surface 308 may reduce or eliminate the chance of displacement of bearing cup 304 during use, depending on the interference value and flange material. Mounting flange 302 may include a stress/strain relief groove or fillet 310 extending circumferentially along the intersection of base surface 308 and an inner wall 311 of mounting flange 302.

Bearing cup may have a chamfer 312 formed to aid in centering bearing cup 304 onto mounting flange 302, and to provide a leading edge for sliding the bearing cup into the mounting flange. The chamfer 312 may also be a fillet or corner break. An ear 314 extends from mounting flange 302. A flexibility pocket 316 is shown formed into ear 314 to provide uniform elastic deformation to bearing cup 304 as bearing cup 304 is press fit into mounting flange 302. When the mounting flange 302 includes a base surface 308, flexibility pocket 316 may extend about to the depth of the base surface 308.

In FIG. 3, bearing cup 304 extends beyond a planar face 318 of mounting flange 302. Accordingly, bearing cup 304 may be used to align mounting flange 302 and bearing cup 304 with a mating structure, such as a pump housing. However, as would be apparent to one skilled in the art, the bearing cup need not extend beyond planar face 318, but may be flush with or below planar face 318.

Figure 4:
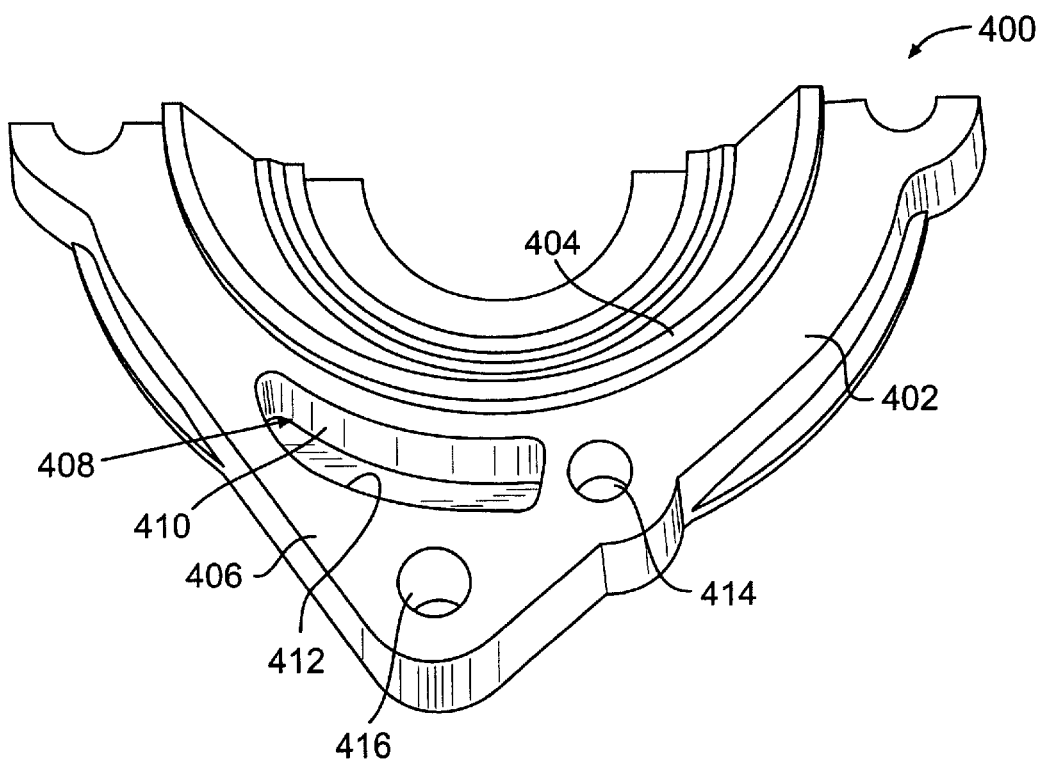
FIG. 4 is a top perspective view of another exemplary embodiment of a mounting flange.

FIG. 4 is a view of an alternative cup and flange assembly 400 having a flexibility pocket. In FIG. 4, a mounting flange 402 houses a bearing cup 404. Formed into an ear 406 of mounting flange 402 is a flexibility pocket 408. In the exemplary embodiment of FIG. 4, flexibility pocket 408 is not a uniform shape. Flexibility pocket 408 may include an inner wall 410 substantially concentric with bearing cup 404 and an outer wall 412 substantially concentric with bearing cup 404 along only a portion of the outer wall. A bolt hole 414 may also be formed at the ear 406. When taken in combination with flexibility pocket 408, bolt hole 414 may provide an element of strain relief. Alternatively, bolt hole 414 may have a depth, a size, and a location that does not provide any strain relief. Furthermore, when bolt hole 414 is formed off-center in ear 406, flexibility pocket 408 may compensate for any inconsistent strain relief provided to mounting flange 402 by bolt hole 414. Flexibility pocket 408 may have whatever shape, location, or configuration is required to provide uniform stress relief. Ear 406 may also include a mounting hole 416 that is used to attach mounting flange to other components.

Industrial Applicability

The size and shape of a flexibility pocket needed to provide uniform elastic radial deformation may be determined based on a number of factors. One factor is the material of the mounting flange. For instance, a cast iron mounting flange may have different deformation than a mounting flange of stainless steel. Because each material has different properties, the material is determined based on the application.

Once the material is selected, the mounting flange geometry is determined based on the design requirements. For instance, the mounting flange may be designed to fit onto existing structure. Accordingly, the mounting flange may have mounting holes and/or bolt holes in specific locations, and may have a mating surface configured to match another component and/or a gasket. Also, depending on whether the mounting flange will be subject to axial and radial loads or just radial loads, the mounting flange may have a base surface formed into a recess. The determined geometry is then evaluated for excessive local radial stiffness, and stress/strain relief grooves may then be formed into the mounting flange for structural integrity.

Based on the stiffness evaluation, flexibility pockets may then be added in necessary shapes and sizes to provide uniform strain relief. The shape and the size of the flexibility pockets may be determined using, for example, finite element analysis to determine the impact of the flexibility pockets on the stress and strain of the mounting flange. The flexibility pockets may also have a proper depth to effectively give uniform deformation. In one exemplary embodiment, the flexibility pockets have a depth about the same as the recess.

A bearing cup may be fitted into the mounting flange using known methods. Structural analysis may then be performed on the press fit bearing cup to verify that the cup shows no signs of non-uniform deformation.

The modeling, the determination of the excessively stiff areas, and the addition of the flexibility cutouts may be done using standard computer modeling programs capable of conducting finite element analysis, such as PRO-ENGINEER and IDEAS. In use, a mounting flange may be manufactured using known processes, such as casting or machining.

Flexibility pockets formed into a mounting flange reduce the variation in radial stiffness of the mounting flange. Flexibility pockets may be formed into the flange in the highly stiff areas to lower the radial stiffness to a uniform value. Accordingly, when a bearing cup is pressed into a mounting flange, the mounting flange may uniformly, elastically deform along the with bearing cup, so that the bearing cup maintains its original precise shape. As such, the rolling elements and the cup roll smoothly against each other. Such a mounting flange may be used on any system requiring a bearing mounting flange for holding a bearing about a rotating shaft.

Flexibility pockets may also give an added advantage of decreased component weight and improved castibility of cast/molded structures due to filling, cooling, and solidification properties. By cutting out materials that adversely affect the strain of the mounting flange, the weight of the mounting flange may be reduced, which may be especially important in large components.

The mounting flange could be used with a bearing cup for any bearing. The bearing may be an anti-friction bearing, and may have any type of roller including, for example, ball, tapered, cylinder, barrel, or other roller. The flexibility pockets could be used in any mounting flange where uniform strain is important.

Other embodiments of the mounting flange will be apparent to those skilled in the art from consideration of the specification and practice disclosed herein, including combinations of pockets and varying the shape of the external lateral surfaces. It is intended that the specification and examples be considered as exemplary only, with a true scope of the specification being indicated by the following claims.

What is claimed is:

1. A mounting flange for housing a bearing cup of a roller bearing, the mounting flange having an outer periphery, the mounting flange comprising:
   a recess sized to receive the bearing cup;
   a radial wall defined by the recess and an outer periphery of the mounting flange, the radial wall having at least a first region of greater radial thickness and a second region of relatively lesser radial thickness, the first region of greater radial thickness defining at least one ear; and
   at least one flexibility pocket in the at least one ear, the at least one flexibility pocket being located to allow an increase in an amount of strain in the ear when the bearing cup is fit into the recess such that the amount of strain in the ear is substantially similar to an amount of strain in the second region of lesser radial thickness to provide substantially uniform, radial deformation to the mounting flange when the bearing cup is fit into the recess.

2. The mounting flange of claim 1, wherein the recess includes a base surface.

3. The mounting flange of claim 2, wherein the at least one flexibility pocket has substantially the same depth as the recess.

4. The mounting flange of claim 1, further including a planar surface configured to mate with a separate component.

5. The mounting flange of claim 1, further including axial relief grooves formed in the wall of the recess.

6. The mounting flange of claim 1, wherein the at least one flexibility pocket has an inner wall concentric with the recess of the mounting flange.

7. The mounting flange of claim 1, wherein the at least one flexibility pocket includes a tapered end and squared end.

8. The mounting flange of claim 1, wherein the at least one flexibility pocket has tapered walls.

9. An assembly, comprising:
   a mounting flange including,
   a recess,
   a radial wall defined by the recess and an outer periphery of the mounting flange, the radial wall having at least a first region of greater radial thickness and a second region of relatively lesser radial thickness, the first region of greater radial thickness defining at least one ear; and
   at least one flexibility pocket in the at least one ear, the at least one flexibility pocket being configured to provide substantially uniform, radial deformation to the mounting flange; and
   a bearing cup press fit in the recess of the mounting flange, wherein the flexibility pocket is located to allow an increase in an amount of strain in the ear when the bearing cup is fit into the recess such that the amount of strain in the ear is substantially similar to an amount of strain in the second region of lesser radial thickness.

10. The assembly of claim 9, wherein the bearing cup is tapered.

11. The assembly of claim 9, wherein the bearing cup has a thickness greater than a depth of the recess.

12. The assembly of claim 9, wherein the bearing cup includes a chamfer.

13. The assembly of claim 9, wherein the bearing cup is held within the mounting flange by an interference fit.

14. The assembly of claim 9, further including a fixed-displacement, variable-delivery hydraulic pump of a hydraulically-actuated, electronically-controlled fuel system, wherein the mounting flange is attached to the hydraulic pump.

15. A fixed-displacement, variable-delivery hydraulic pump, comprising:
   a pump housing;
   a shaft extending from the pump housing, the shaft being configured to be driven by a drive gear of an engine;
   a mounting flange attached to the housing, wherein the mounting flange has a recess and a bore, and the shaft extends through the bore, the mounting flange including
   a radial wall defined by the recess and an outer periphery of the mounting flange, the radial wall having at least a first region of greater radial thickness than the radial thickness of a second region, the first region of greater radial thickness defining at least one ear,
   at least one flexibility pocket within the at least one ear of the mounting flange, the at least one flexibility pocket configured to provide substantially uniform, radial deformation to the mounting flange, and
   at least one axial relief groove formed into the recess; and
   a bearing cup press fit into the recess of the mounting flange.

16. The pump of claim 15, wherein the recess includes a base surface.

17. The pump of claim 16, wherein the at least one flexibility pocket has substantially the same depth as the recess.

18. A mounting flange for housing an outer race of an anti-friction bearing, comprising:
   a radial wall having an outer periphery, a bore configured to receive the outer race and a longitudinal axis;
   a first radial wall region having a first predetermined radial wall thickness measured in a radial direction relative to the longitudinal axis between the outer periphery and the bore;
   a second radial wall region being spaced from the first radial wall region and having a second predetermined radial wall thickness measured in a radial direction relative to the longitudinal axis between the outer periphery and the bore, the second predetermined radial wall thickness being greater in magnitude than the first predetermined radial wall thickness; and
   a flexibility pocket disposed in the radial wall at a location adjacent the second region between the outer periphery and the bore, the flexibility pocket being located to allow an increase in an amount of strain in the second radial wall region in response to a loading of the radial wall by the outer race, such that the amount of strain in the second radial wall region is substantially similar to an amount of strain the first radial wall region to provide substantially equal deformation of the radial wall relative to the longitudinal axis at the first and second radial wall regions in response to the loading if the radial wall by the outer race.

19. The mounting flange of claim 18, wherein the recess including a base surface.

20. The mounting flange of claim 19, wherein the at least one flexibility pocket has substantially the same depth as the recess.

21. The mounting flange of claim 18, further including axial relief grooves formed in the recess.

22. The mounting flange of claim 18, wherein the at least one flexibility pocket has an inner wall concentric with the recess of the mounting flange.

* * * * *